Patented Mar. 2, 1937

2,072,376

UNITED STATES PATENT OFFICE 2,072,376

PROCESS OF REMOVING FLUORIDES FROM WATER

Ralph H. McKee and William S. Johnston, New York, N. Y.

No Drawing. Application November 14, 1934, Serial No. 752,944

13 Claims. (Cl. 210—23)

The present invention relates to a process of removing fluorides from water and, more particularly, to a process of removing fluorides from drinking water.

Heretofore, it has been known that the enamel of teeth of children became mottled under certain conditions from drinking water. No cure had been found once the teeth have been injured. The mottling of teeth was reported by Eager in 1901 [U. S. Public Health Report, 16, 2576, (1901)]. Many publications were made but it was not until Churchill indicated that fluorine was probably the cause of mottled teeth that determination of this element was made in affected areas [Ind. Eng. Chem., 23, 996 (1931)]. A definite confirmation that fluorine was the cause of the aforesaid difficulty has been made by McKay [J. Am. Dental Assoc. 20, 1137 (1933)] and by Smith et al [Arizona Agricultural Expt. Station, Tech. Bull. 45 (1932)]. Boruff proposed to remove fluorine from water by use of alumina and zeolites [Ind. Eng. Chem. 26, 69 (1934)], but no concentration in excess of 5.0 parts per million of fluorine was used and even at this concentration removals were not satisfactory. Various attempts have been made, but, as far as we are aware, no method has been proposed which is wholly satisfactory and successful when carried into practice on a practical scale.

It is an object of the present invention to provide a method which will remove fluorides from potable water by adsorption by carbon.

A further object of the invention is to provide a method for the effective removal of fluorides from drinking water in a relatively simple and practical manner.

It is also within the contemplation of the invention to provide a method involving the adsorption of fluorides by carbon and the revivification of the latter for re-use in adsorbing further quantities of fluorides from untreated water.

Other objects and advantages of the invention will become apparent from the following description.

Water contaminated with fluorides is acidified and brought into contact with activated carbon, or the water contaminated with fluorides but substantially neutral is brought into contact with carbon which has been activated with acid. We have found that the residual carbon produced as a by-product of the soda pulp industry can be used to give satisfactory and practical results. For best results the water is treated at a pH of about 3 and preferably a pH of about 3.6 to about 2.5 and after removal of the fluorides neutralized with lime or other agents. The efficiency of adsorption in relation to the pH of water containing about 8.0 p. p. m. of fluorine is as follows:—

| pH | Percent fluorine removed |
|---|---|
| 6.90 | 4 (approximately) |
| 3.57 | 49 |
| 3.16 | 88 |
| 3.01 | 100 |
| 2.53 | 99 |
| 2.38 | 99 |
| 2.25 | 100 |

The efficiency of fluorine removal by the carbon, when only about 0.08 per cent by weight of carbon to the weight of water was used, is as follows:—

| Fluorine added p. p. m. | Fluorine removed p. p. m. |
|---|---|
| 10.0 | 8.45 |
| 10.0 | 7.50 |
| 7.5 | 7.05 |
| 5.0 | 4.60 |
| 2.5 | 2.75 |

From the foregoing table, it will be noted that about 0.08 per cent carbon will remove practically all the fluorine from water containing up to about 7.5 p. p. m., and about 80.0 per cent from water with about 10.0 p. p. m. One part fluorine per million is the maximum that may be allowed in potable water if mottling of children's teeth is to be avoided. Since the majority of waters analyzed from the endemic areas showed about 8.0 p. p. m. or less, then about 0.08 per cent of activated carbon would seem to be sufficient in most cases. This was confirmed by using a water containing about 8.0 p. p. m. at a pH of about 2.25, where 0.08 per cent carbon removed all the fluorine, but 0.04 per cent removed about 76 per cent, and 0.02 per cent only about 57 per cent.

Fluorine contaminated water was treated continuously in accordance with the present method in a continuous apparatus. The carbon used passed through a 16-mesh sieve but was held on a 30-mesh sieve. The water was flowed through the carbon at such a rate that a constant, slight hydrostatic head was maintained during each run. In order to determine the rate of adsorption of the fluorine, the effluent water was collected in 2-liter samples which were analyzed. In the following table, the results are indicated for runs A and B where water containing 8 p. p. m. of fluorine was treated. In A an acid washed carbon was used and in B an inactive carbon was activated by the water of pH 3.

| Filtrate liters | Run A | | Run B | |
| --- | --- | --- | --- | --- |
| | pH | P. p. m. | pH | P. p. m. |
| 0-2 | 6.4 | 2.0 | 6.6 | 4.0 |
| 3-4 | 3.3 | | 5.7 | 0.0 |
| 5-6 | 3.1 | 0.5 | 4.8 | 0.0 |
| 7-8 | 3.1 | | 4.5 | 0.0 |
| 9-10 | 3.1 | 1.0 | 4.2 | |
| 11-12 | 3.1 | | 3.8 | |
| 13-14 | 3.1 | 3.0 | 3.5 | 0.5 |
| 15-16 | 3.1 | | 3.3 | 0.5 |
| 17-18 | 3.1 | 4.0 | 3.3 | |

The rates of flow in the foregoing continuous runs are as follows:—

| Filtrate | Run A | Run B |
| --- | --- | --- |
| Liters | Min. | Min. |
| 3-4 | 7.75 | 3.50 |
| 5-6 | | |
| 9-10 | 7.75 | 4.75 |
| 11-12 | | |
| 15-16 | 9.00 | 5.75 |
| 17-18 | | |

The revivification of the carbon is preferably accomplished by washing the carbon with a weak, say, about 1 to 5%, caustic soda solution, and then the caustic washed out with a dilute acid solution, say 1/100 of one percent sulfuric acid or its equivalent. Acidified water having a pH of 3, such as the acidified water being treated, will serve equally well for this wash. This alkali treatment will remove the fluorides. The carbon after the acid wash will then be ready for reuse without drying or further treatment. Drying will do it no harm but will do it no good.

The carbon used in the present process may be a carbon of the type of a decolorizing carbon made by heating organic materials in the absence of air but in the presence of an alkali, such as sodium carbonate, and then activating by means of an acid wash. A specific case of the foregoing is the treatment of the residue from manufacture of soda pulp for making paper. Such residue is preferably heated to redness out of contact with the air. After cooling, the heat-treated residue known as black ash residue, is preferably subjected to the action of acid, say about one tenth percent solution of hydrochloric. A carbon made by heating organic materials with alkali and allowing the acidified water itself to activate the carbon also gave satisfactory results. Of commercial carbons other than that used by us, that made by heating lignite with the alkali naturally present in it and then activating with acid would meet the definition of the first of these carbons mentioned above.

We claim:—

1. The method of removing fluorides from drinking water which comprises contacting acidified water containing fluorides with residual carbon of the type produced by the soda pulp industry.

2. The method of removing fluorides from drinking water which comprises subjecting the acidified water containing fluorides to the action of black-ash residues from soda pulp industry.

3. The method of removing fluorides from drinking water which comprises subjecting water containing fluorides to the action of acid-treated black-ash residue from soda pulp industry, regenerating said residue by washing with weak caustic soda solution and washing out the caustic with dilute acid solution.

4. The method of removing fluorides from drinking water which comprises subjecting water containing fluorides and acidified to the action of black-ash residue from soda pulp industry previously heated to redness.

5. The method of removing fluorides from drinking water which comprises contacting water containing fluorides with acidified adsorbent carbon, then regenerating said carbon by treating the adsorbent carbon with an alkaline solution, and subsequently washing the said carbon with water containing an acid.

6. The method of removing fluorides from drinking water which comprises contacting acidified water containing fluorides with adsorbent carbon, reactivating the carbon and continuing the removal of the fluorides from the water.

7. The method of removing fluorides from drinking water which comprises contacting water containing fluorides with acidified adsorbent carbon, then regenerating said carbon by treating the adsorbent carbon with a weak caustic soda solution, subsequently subjecting said carbon to the action of a dilute acid solution, and then contacting said carbon with additional quantities of water containing fluorides.

8. The method of removing fluorides from drinking water which comprises contacting water containing fluorides with acidified adsorbent carbon, then regenerating said carbon by treating the adsorbent carbon with a caustic soda solution having a strength of about 1% to about 5%, and subsequently subjecting said carbon to the action of an acid solution having a strength of about 0.01%.

9. The method of removing fluorides from drinking water which comprises continuously flowing water containing fluorides in contact with acidified adsorbent carbon, discontinuing the flow of said water, treating the adsorbent carbon with an alkaline solution, and subjecting said carbon to the action of an acid to revivify the carbon.

10. The method of removing fluorides from drinking water which comprises acidifying the water containing the fluorides, contacting the acidified water with adsorbent carbon to remove fluorides, and neutralizing the acidified and treated water.

11. The method of removing fluorides from drinking water which comprises acidifying the water containing the fluorides, continuously flowing the acidified water in contact with adsorbent carbon to remove fluorides, and neutralizing the acidified and treated water.

12. The method of removing fluorides from drinking water which comprises contacting water containing fluorides with adsorbent carbon whilst maintaining a pH of about 3.

13. The method of removing fluorides from drinking water which comprises contacting water containing fluorides with adsorbent carbon whilst maintaining a pH of about 3 and neutralizing the treated water.

RALPH H. McKEE.
WILLIAM S. JOHNSTON.